UNITED STATES PATENT OFFICE.

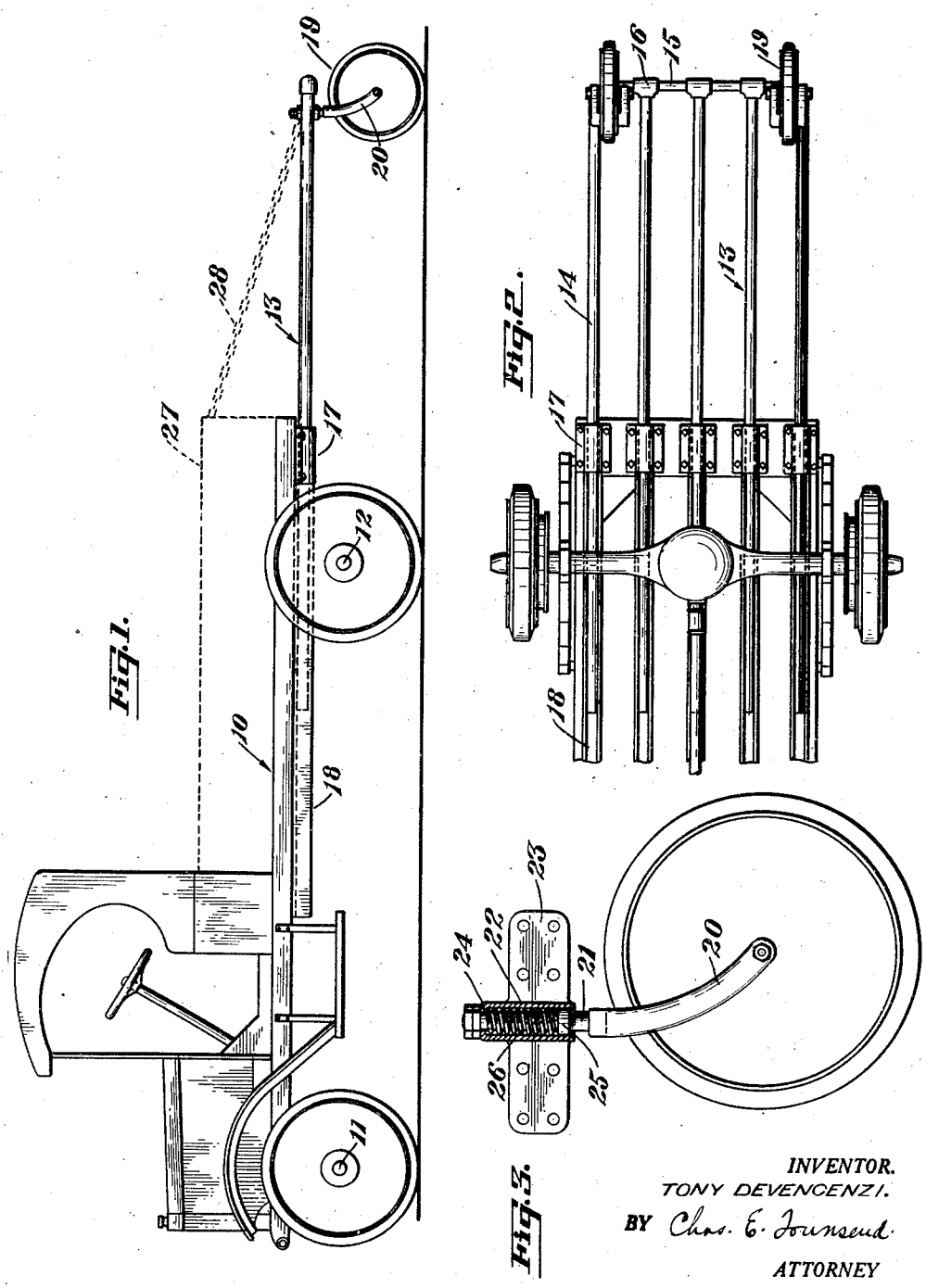

TONY DEVENCENZI, OF SAN FRANCISCO, CALIFORNIA.

TRUCK EXTENSION.

1,366,771.     Specification of Letters Patent.     Patented Jan. 25, 1921.

Application filed July 28, 1920. Serial No. 399,460.

*To all whom it may concern:*

Be it known that I, TONY DEVENCENZI, a citizen of the United States, residing at the city and county of San Francisco and State of California, have invented new and useful Improvements in Truck Extensions, of which the following is a specification.

This invention relates to vehicle construction, and particularly pertains to an extension body for trucks.

In using a truck for hauling, it often occurs that the articles transported are of considerable bulk and of light weight. In this case, the vehicle would not be overtaxed with a large bulk of goods providing that they could be properly carried upon the truck body. It is the principal object of the present invention, therefore, to provide a simple extension body for trucks which will permit the bulk-carrying capacity of the truck to be greatly enlarged when desired, and, in fact, to be accurately adjusted to the dimensions of the articles carried.

The present invention contemplates the use of telescoping frame members which may be moved in and out beneath the truck and will form a continuation of the truck floor, said extension frame being fitted with supporting wheels adapted to partially carry the load imposed upon the frame without extreme strains being imparted to the frame or the sliding mountings therefor.

The invention is illustrated by way of example in the accompanying drawings, in which—

Figure 1 is a view in side elevation illustrating the motor truck equipped with the extension body with which the present invention is concerned, said body here shown as in its extreme position.

Fig. 2 is a fragmentary view in plan as viewed from beneath the motor truck showing the sliding connections for the extension body.

Fig. 3 is an enlarged view in section and elevation illustrating one of the supporting wheels of the frame.

Referring more particularly to the drawings, 10 indicates the body of a motor vehicle mounted upon a front axle structure 11 and a rear axle 12. The vehicle body may, of course, be of any common design and dimensions. The present invention is more particularly concerned with an extension frame 13 by which the carrying capacity of the vehicle may be increased.

This frame is perfectly formed by a plurality of parallel rods or pipes 14, which are rigidly secured at their outer ends to a transverse pipe member 15 by means of pipe T's 16. The parallel rods 14 extend through sliding bearings 17 properly secured to the underside of the main truck frame and across the rear end thereof. The bars 14 are slidably supported through the bearings 17, and are furthermore guided by longitudinally extending channels 18 secured beneath the truck frame. By this guide and mounting arrangement it is possible for the extension frame 13 to be readily withdrawn from beneath the vehicle to any desired length or restored to a normal closed position.

When the extension frame 13 is in its extreme extended position, it is necessary to properly support the outer end of the frame to prevent undue strain upon the frame members. In the present instance, this is accomplished by trailer wheels 19 mounted on axle forks 20. The forks 20, as more clearly shown in Fig. 3, have a vertically extending spindle 21. This spindle extends through a tubular vertical bearing 22 and within which it is free to rotate. The bearing 22 is formed with a bolting pad 23 which is secured to some part of the extension frame near the rear end thereof.

In order to properly brace the spindle 21, the upper end of the bearing is formed with a guide opening 24 through which the spindle extends and which opening closely conforms to the circumference of the spindle. A rigid shoulder 25 is secured on the spindle near its lower end and substantially agrees in outside diameter with that of the main bore bearing, thus bracing the lower end of the spindle and permitting it to rotate within the bearing without binding. A coiled spring 26 is disposed around the spindle within the bearing and interposed between the shoulder 25 and the upper end wall of the bearing. This spring will permit considerable vibration of the axle fork to take place, and thus absorb the road shock which would naturally result from the movement of the vehicle along a highway. It is also to be noted that, due to the exterior arrangement of the wheels, both wheels will at all times follow with the rear wheels of the vehicle, thereby insuring that the rear end of the extension body will be constantly supported and that the tires of the trailer wheels will be subjected to a minimum wear.

In operation of the present invention, the device is assembled as shown in Figs. 1 and 2, after which the extension frame is moved inwardly to become substantially concealed beneath the vehicle body. If the capacity of the truck is to be enlarged, the extension frame is drawn from beneath the vehicle body and the rods 14 caused to slide along the guide channels 18 and through the sliding bearings 17. If desired, a truck bed 27 may be used and supporting chains 28 adjustably secured from an elevated point on the bed to a point upon the extreme end of the extension frame. The vehicle may be loaded and driven in the usual manner without danger of undue strain or other accident, due to the presence of the extension frame at the rear of the main frame.

It will thus be seen that the design here disclosed permits a truck body to be readily adjusted to accommodate articles of different bulk, and at the same time properly support these articles without damage to the vehicle running gear or its frame.

While I have shown the preferred form of the invention as now known to me, I wish it understood that various changes in the construction, combination and arrangement of parts may be made by those skilled in the art without departing from the spirit of the invention as claimed.

Having thus described my invention, what I claim and desire to secure by Letters Patent is:

1. In combination with a vehicle body, an extension frame comprising a plurality of parallel rods rigidly secured in relation to each other at their rear ends, bearing members carried upon the truck frame through which said rods may telescope, and channel members disposed beneath the truck frame within which the rods may lie and by which they will be supported against lateral movement.

2. In combination with a vehicle body, an extension frame comprising a plurality of parallel rods rigidly secured in relation to each other at their rear ends, bearing members carried upon the truck frame through which said rods may telescope, channel members disposed beneath the truck frame within which the rods may lie and by which they will be supported against lateral movement, and exterior wheels disposed at the corners of the rear end of the frame.

3. The combination with a vehicle of an extension frame, consisting of a plurality of parallel bars, rigid transverse resisting bars at the rear end, guides disposed in line beneath the vehicle, within which the bars are slidable to extend or contract the structure, caster wheels having turnable supports at the rear outer angles of the extension frame, and vertically disposed cushion members upon which the spindles of the caster wheel frames are borne.

4. The combination with a vehicle of an extension frame consisting of a plurality of parallel longitudinally disposed bars, transverse, uniting members at the rear end, parallel bearings on the rear of the vehicle, through which the bars are slidable, caster wheels having vertical spindles extending into and turnable in sockets fixed to the rear angles of the extension frame, collars on the spindles, fitting within the spindle sockets, and spiral springs inclosing the spindles and compressible between the collars and the upper ends of the sockets.

5. A vehicle extension apparatus comprising parallel bars rigidly united at the rear ends, caster wheels and vertical journal boxes at the rear angles of the extension, in which the wheel spindles are turnable, guides fixed beneath the rear end of the vehicle, and channeled members alined with said guides to receive the extension bars, and spiral springs surrounding the wheel spindles, to yield and maintain the extension bars in alinement within their bearing guides.

In testimony whereof I have hereunto set my hand in the presence of two subscribing witnesses.

TONY DEVENCENZI.

Witnesses:
EUGENIA M. HOEY,
M. L. THOMAS.